United States Patent
Goto et al.

(10) Patent No.: US 7,218,837 B2
(45) Date of Patent: May 15, 2007

(54) PROGRAM-SIGNAL RECORDING AND REPRODUCING APPARATUS

(75) Inventors: Nobuyuki Goto, Chigasaki (JP); Noriaki Fukutsu, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 1157 days.

(21) Appl. No.: 09/938,577

(22) Filed: Aug. 27, 2001

(65) Prior Publication Data

US 2002/0037151 A1    Mar. 28, 2002

(30) Foreign Application Priority Data

Sep. 25, 2000 (JP) ............................. 2000-290217
Sep. 25, 2000 (JP) ............................. 2000-290218

(51) Int. Cl.
*H04N 5/76* (2006.01)
*H04N 7/00* (2006.01)
*H04N 7/26* (2006.01)
*G11B 5/00* (2006.01)
*H04N 5/85* (2006.01)
*H04N 5/90* (2006.01)
*H04N 5/781* (2006.01)

(52) U.S. Cl. .................... 386/68; 386/46; 386/112; 386/125; 360/7

(58) Field of Classification Search ............... 386/111, 386/125, 46, 112, 126; 360/7
See application file for complete search history.

(56) References Cited

U.S. PATENT DOCUMENTS

| 6,360,057 | B1 * | 3/2002 | Tsumagari et al. ............ 386/95 |
| 6,411,771 | B1 * | 6/2002 | Aotake ........................ 386/52 |
| 6,788,882 | B1 * | 9/2004 | Geer et al. .................. 386/116 |
| 6,847,778 | B1 * | 1/2005 | Vallone et al. ................ 386/68 |

FOREIGN PATENT DOCUMENTS

| WO | WO 95/32584 | 11/1995 |
| WO | WO 99/33265 | 7/1999 |

* cited by examiner

*Primary Examiner*—Thai Q. Tran
*Assistant Examiner*—Gelek Topgyal
(74) *Attorney, Agent, or Firm*—Louis Woo

(57) ABSTRACT

A program signal is recorded on a recording medium. The program signal is reproduced from the recording medium. First time information is generated in accordance with lapse of time. Second time information is generated from the reproduced program signal. The second time information represents one of (1) a time at which the program signal was recorded and (2) a time at which the program signal was broadcasted. On-screen information is superimposed on the reproduced program signal. The on-screen information represents (1) a picture portion indicative of a time, (2) a first mark positionally corresponding to the first time information, and (3) a second mark positionally corresponding to the second time information.

8 Claims, 5 Drawing Sheets

PROGRAM-SIGNAL RECORDING AND REPRODUCING APPARATUS

BACKGROUND OF THE INVENTION

1. Field of the Invention

This invention relates to an apparatus for recording and reproducing a signal representative of a program on and from a recording medium such as a hard disk or a semiconductor memory.

2. Description of the Related Art

Personal video recorders (PVR's) are designed to record and reproduce signals representative of programs on and from hard disks. A typical PVR can simultaneously implement the recording of a first program signal and the reproduction of a second program signal on a time sharing basis.

Specifically, the typical PVR can record a signal of a program on the hard disk while reproducing a signal of another program therefrom. In addition, the typical PVR can record a signal of a program on the hard disk while implementing time shift playback which reproduces a head portion or an already-recorded portion of the same program signal from the hard disk.

Furthermore, the typical PVR can implement cache playback as follows. The hard disk is used as a cache disk. A signal representing a currently-broadcasted program is always recorded on the cache disk, that is, the hard disk. An amount of the program signal stored in the cache disk substantially corresponds to a prescribed play time. In the case where a PVR user requires playback from a scene somewhat preceding the current scene, the cache disk is accessed and a portion of the recorded program signal which starts from the required scene is reproduced from the cache disk.

During the implementation of the time shift playback or the cache playback, a program signal reproduced from the hard disk is indicated on a display. Only by watching a program indicated on the display, it is difficult for the PVR user to know whether the indicated program is a currently-broadcasted program or a program represented by a signal reproduced from the hard disk.

In the case where a program visualized on the display during the time shift playback or the cache playback has a superimposed indication of time at the left upper corner of the frame, the PVR user sometimes confuses the indicated time with the present time.

SUMMARY OF THE INVENTION

It is an object of this invention to provide a program-signal recording and reproducing apparatus which enables a program to be indicated on a display in a manner such that a user can easily know whether the indicated program is a currently-broadcasted program or a program represented by a signal reproduced from a recording medium.

It is another object of this invention to provide a program-signal recording and reproducing apparatus which enables the position (the time position) of a currently played-back segment of a reproduced program to be clearly indicated.

A first aspect of this invention provides a program-signal recording and reproducing apparatus comprising first means for recording a program signal on a recording medium; second means for reproducing the program signal from the recording medium; third means for generating first time information in accordance with lapse of time; fourth means for generating second time information from the program signal reproduced by the second means, the second time information representing one of (1) a time at which the program signal was recorded by the first means and (2) a time at which the program signal was broadcasted; and fifth means for superimposing on-screen information on the program signal reproduced by the second means, the on-screen information representing (1) a picture portion indicative of a time, (2) a first mark positionally corresponding to the first time information generated by the third means, and (3) a second mark positionally corresponding to the second time information generated by the fourth means.

A second aspect of this invention is based on the first aspect thereof, and provides a program-signal recording and reproducing apparatus wherein the first means comprises means for recording the first time information generated by the third means on the recording medium as the second time information together with the program signal.

A third aspect of this invention provides a program-signal recording and reproducing apparatus for recording a program signal on a recording medium, and reproducing an already-recorded portion of the program signal which is being recorded on the recording medium. The apparatus comprises time information generating means for generating time information in accordance with lapse of time; recording means for recording the time information generated by the time information generating means or time information indicating time at which the program signal is broadcasted on the recording medium together with the program signal; a head retrieval command input means for performing a program head retrieval command; and first head retrieval reproduction means for, when the program head retrieval command is performed by the head retrieval command input means, obtaining present time information generated by the time information generating means and performing head retrieval reproduction of the program signal recorded at time of 00-minute or 30-minute in an hour which is previous to the present time represented by the obtained present time information.

A fourth aspect of this invention is based on the third aspect thereof, and provides a program-signal recording and reproducing apparatus further comprising a cache playback mode in which a program signal temporally continuous from past to now is always recorded on a recording medium while a prescribed amount is a limit, and an already-recorded portion of the program signal which is being recorded is reproduced; a time shift playback mode in which, with respect to a program signal recorded on the recording medium on the basis of a record start timing decided by operation by a user, and an already-recorded portion of the program signal which is being recorded is reproduced; and second head retrieval reproduction means for, when the program head retrieval command is performed by the head retrieval command input means, performing head retrieval reproduction of the program signal from the record start timing; wherein the head retrieval reproduction is performed by the first head retrieval reproduction means in the cache playback mode, and the head retrieval reproduction is performed by the second head retrieval reproduction means in the time shift playback mode.

A fifth aspect of this invention provides a program-signal recording and reproducing apparatus comprising first means for recording a program signal on a recording medium; second means for generating first time information representing the present time; third means for generating second time information representing one of (1) a time at which the program signal was recorded by the first means and (2) a time at which the program signal was broadcasted; fourth means for determining a specified time point which precedes the present time represented by the first time information generated by the second means; and fifth means for finding a segment of the program signal on the recording medium according to the specified time point determined by the fourth means and the second time information generated by the third means, the program-signal segment relating to the second time information corresponding to the specified time point, and for reproducing the found segment and subsequent segments of the program signal from the recording medium.

A sixth aspect of this invention is based on the fifth aspect thereof, and provides a program-signal recording and reproducing apparatus wherein the specified time point corresponds to time whose minute part is 00.

A seventh aspect of this invention is based on the fifth aspect thereof, and provides a program-signal recording and reproducing apparatus wherein the specified time point corresponds to time whose minute part is 30.

An eighth aspect of this invention provides a program-signal recording and reproducing apparatus comprising first means for recording a first program signal on a recording medium while leaving only a latest temporally-continuous portion of the first program signal in the recording medium as a cached portion; second means for generating first time information representing the present time; third means for generating second time information representing one of (1) a time at which the first program signal was recorded by the first means and (2) a time at which the first program signal was broadcasted; fourth means for determining a specified time point which precedes the present time represented by the first time information generated by the second means; fifth means for accepting a head-retrieval command; sixth means responsive to the head-retrieval command accepted by the fifth means for finding a segment of the latest temporally-continuous portion of the first program signal on the recording medium according to the specified time point determined by the fourth means and the second time information generated by the third means, the program-signal segment relating to the second time information corresponding to the specified time point, and for reproducing the found segment and subsequent segments of the program signal from the recording medium during a cache playback mode of operation; seventh means for recording a second program signal on the recording medium in response to a designated record start timing; and eighth means responsive to the head-retrieval command accepted by the fifth means for reproducing the second program signal from the recording medium during a time shift playback mode of operation.

A ninth aspect of this invention is based on the eighth aspect thereof, and provides a program-signal recording and reproducing apparatus wherein the specified time point corresponds to time whose minute part is 00.

A tenth aspect of this invention is based on the eighth aspect thereof, and provides a program-signal recording and reproducing apparatus wherein the specified time point corresponds to time whose minute part is 30.

DETAILED DESCRIPTION OF THE INVENTION

First Embodiment

Figure 1:
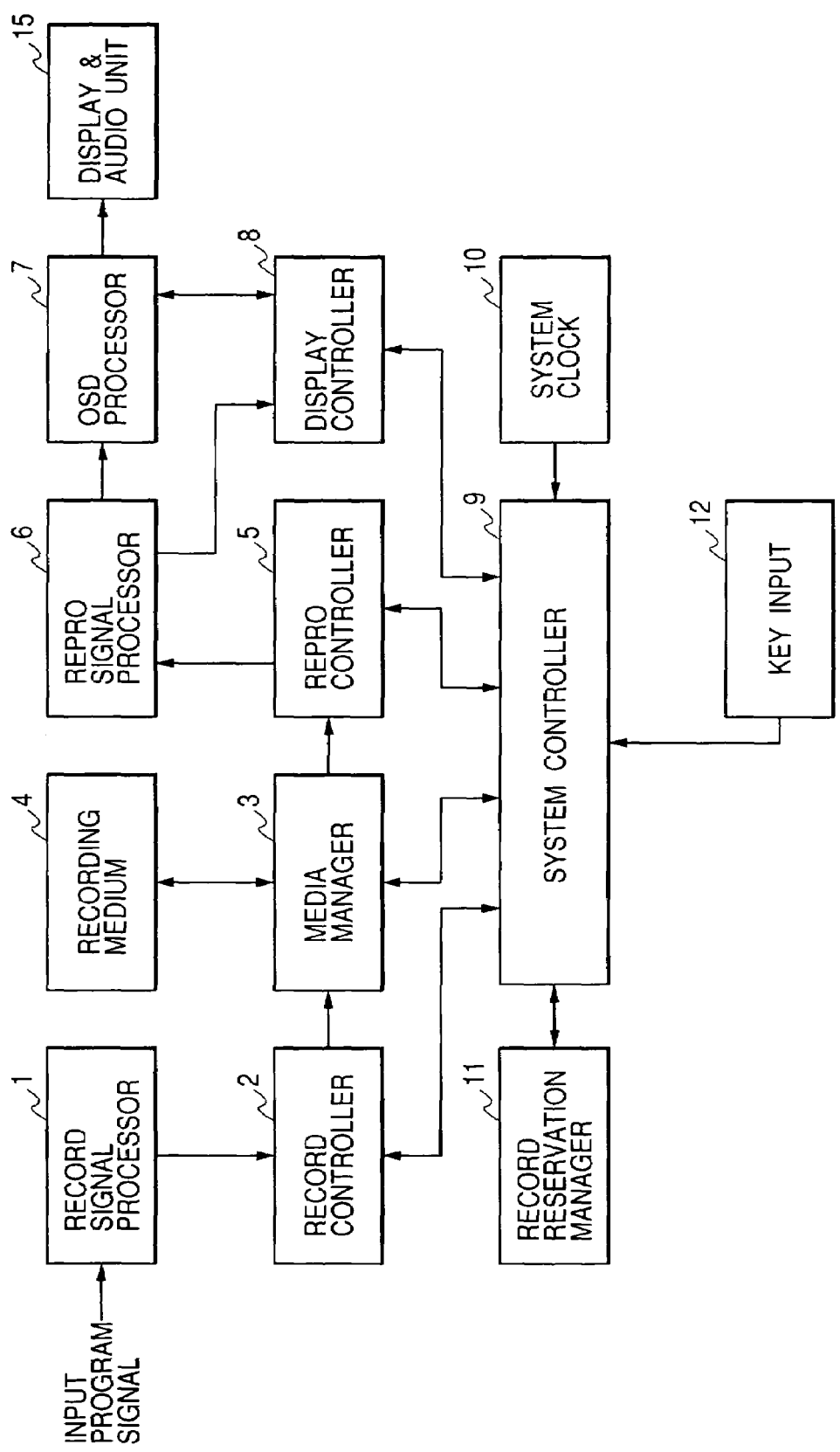
FIG. 1 is a block diagram of a program-signal recording and reproducing apparatus according to a first embodiment of this invention.

FIG. 1 shows a program-signal recording and reproducing apparatus according to a first embodiment of this invention. The apparatus of FIG. 1 can be connected with, for example, a television receiver or both a tuner and a television receiver. In the apparatus of FIG. 1, a record signal processor 1 is connected with a record controller 2. The record controller 2 is connected with a media manager 3 and a system controller 9. The media manager 3 can access a recording medium 4 which includes, for example, a hard disk or a semiconductor memory. The media manager 3 is connected with a reproduction controller 5 and the system controller 9. The reproduction controller 5 is connected with a reproduced signal processor 6 and the system controller 9. The reproduced signal controller 6 is connected with an OSD (on-screen display) processor 7 and a display controller 8. The OSD processor 7 is connected with the display controller 8. The display controller 8 is connected with the system controller 9. The system controller 9 is connected with a system clock 10, a record reservation manager 11, and a key input unit 12.

The record signal processor 1 can be connected with, for example, a tuner or a television receiver. A program signal to be recorded, that is, a signal representing a program to be recorded, is inputted into the record signal processor 1 from, for example, the tuner or the television receiver. The record signal processor 1 includes a compressive encoder such as an MPEG encoder. Here, "MPEG" is short for Moving Picture Experts Group. The record signal processor 1 subjects the input program signal to a compression process, for example, an MPEG-based compression process, to get the compression-resultant program signal (the program signal of the MPEG format). The record signal processor 1 outputs the compression-resultant program signal to the record controller 2.

The record controller 2 adds auxiliary information to the compression-resultant program signal. The record controller 2 stores the auxiliary-information-added program signal into a buffer (not shown). The record controller 2 reads out the auxiliary-information-added program signal from the buffer and outputs the read-out program signal to the media manager 3 at a prescribed timing.

The media manager 3 converts the program signal from the record controller 2 into a program signal of a prescribed format suited for record on the recording medium 4. The media manager 3 includes a drive for the recording medium 4. The media manager 3 records the prescribed-format program signal on the recording medium 4. The media manager 3 reproduces the prescribed-format program signal from the recording medium 4. The media manager 3 converts the reproduced program signal into a program signal of an original format equal to the format of a program signal outputted from the record controller 2. The media manager 3 outputs the resultant program signal to the reproduction controller 5.

The reproduction controller 5 stores the program signal from the media manager 3 into a buffer (not shown). The reproduction controller 3 reads out the program signal from the buffer and outputs the read-out program signal to the reproduced signal processor 6 at a prescribed timing. In addition, the reproduction controller 5 extracts the auxiliary information from the program signal. The reproduction controller 5 outputs the extracted auxiliary information to the system controller 9.

The reproduced signal processor 6 includes an expansive decoder such as an MPEG decoder. The reproduced signal processor 6 subjects the program signal from the reproduction controller 5 to an expansion process, for example, an MPEG-based expansion process, to get the expansion-resultant program signal. The expansion process is inverse with respect to the compression process by the record signal processor 1. The reproduced signal processor 6 outputs the expansion-resultant program signal to the OSD processor 7. The expansion-resultant program signal has a set of a video signal and an audio signal (or audio signals). The reproduction signal processor 6 generates a sync signal related to the video signal. The reproduction signal processor 6 outputs the sync signal to the display controller 8.

The OSD processor 7 adds on-screen information (OSI) to the program signal outputted from the reproduced signal processor 6. In other words, the OSD processor 7 superimposes the on-screen information (OSI) on the program signal outputted from the reproduced signal processor 6. The OSD processor 7 can be connected with, for example, a display and audio unit 15 of the television receiver. The OSD processor 7 outputs the OSI-added program signal to, for example, the display and audio unit 15 of the television receiver. A video signal in the OSI-added program signal can be indicated on a display of the television receiver while an audio signal therein can be converted into corresponding sounds by loudspeakers of the television receiver. The display controller 8 controls the OSD processor 7 on the basis of a timing determined by the sync signal fed from the reproduced signal processor 6.

The system controller 9 controls the record controller 2, the media manager 3, the reproduction controller 5, and the display controller 8 while sending and receiving information to and from the devices 2, 3, 5, and 8. The system controller 9 includes, for example, a microcomputer or a similar device having a combination of an input/output port, a processing section, a RAM, and a ROM. The system controller 9 operates in accordance with a control program stored in the ROM. The control program is designed to enable the system controller 9 to implement steps of operation which will be mentioned later.

The system clock 10 feeds information of the present date and information of the present time to the system controller 9. The record reservation manager 11 includes a memory storing information of program reservations. The record reservation manager 11 sends and receives information to and from the system controller 9. The key input unit 12 can be operated by a user. The key input unit 12 outputs signals of user's commands to the system controller 9 when being operated by the user. The key input unit 12 includes an array of keys or buttons provided on the body of the apparatus. The key input unit 12 may include a combination of a remote control transmitter and a remote control receiver, or an external device connected via an interface such as an IEEE1394 interface.

Operation of the apparatus of FIG. 1 can be changed among various modes in response to command signals inputted via the key input unit 12. The modes of operation of the apparatus includes a normal recording mode, a normal playback mode, a cache-ON recording mode, a cache playback mode, a cache fast-forward playback mode, a cache rewind playback mode, and a time shift playback mode.

The normal recording mode of operation of the apparatus is started when a record command signal is inputted into the system controller 9 via the key input unit 12. During the normal recording mode of operation of the apparatus, the record signal processor 1 converts an input program signal into a compressed program signal of the MPEG format. The record signal processor 1 outputs the MPEG program signal to the record controller 2. On the other hand, the system controller 9 receives the present-date information and the present-time information from the system clock 10. The system controller 9 transfers the present-date information and the present-time information to the record controller 2. The record controller 2 generates a frame information related to the MPEG program signal. The record controller 2 combines the present-date information, the present-time information, and the frame information into auxiliary information. The record controller 2 adds the auxiliary information to the MPEG program signal. The added auxiliary information is equivalent to information of the broadcasting time or the on-air time (the on-air time stamp) of the program signal. The record controller 2 has an internal buffer. The record controller 2 stores the auxiliary-information-added program signal into the internal buffer.

During the normal recording mode of operation of the apparatus, the record controller 2 is controlled by the system controller 9 so that the auxiliary-information-added program signal is read out from the buffer in the record controller 2 and is outputted to the media manager 3. The media manager 3 is controlled by the system controller 9, thereby converting the program signal from the record controller 2 into a program signal of the prescribed format suited for record on the recording medium 4. The media manager 3 records the prescribed-format program signal on the recording medium 4 while being controlled by the system controller 9. The program signal recorded on the recording medium 4 contains the auxiliary information. In the case where the recording medium 4 includes a hard disk, the media manager 3 converts the program signal from the record controller 2 into data of a prescribed file format suited for record on the hard disk. Under the control by the system controller 9, the media manager 3 generates program-related information which represents the relation between the added auxiliary information and the addresses on the recording medium 4 at which the recorded program signal is located. The media manager 3 records the program-related information on the recording medium 4 in addition to the auxiliary-information-added program signal.

In general, the system controller 9 is informed of a designated playback start point (a desired playback start point) via the key input unit 12 when the apparatus is required to operate in the normal playback mode. The system controller 9 notifies the media manager 3 of the designated playback start point. The normal playback mode of operation of the apparatus is started when a playback command signal is inputted into the system controller 9 via the key input unit 12. Specifically, in response to the playback command signal, the system controller 9 controls the media manager 3 to read out the program-related information from the recording medium 4. The media manager 3 refers to the program-related information, and thereby determines a start address on the recording medium 4 which corresponds to the designated playback start point. The media manager 3 accesses the point on the recording medium 4 which is designated by the start address. The media manager 3 reproduces a designated program signal from the recording medium 4 at the start address and subsequent addresses while being controlled by the system controller 9. Under the control by the system controller 9, the media manager 3 converts the reproduced program signal into a program signal of an original format equal to the format of a program signal outputted from the record controller 2. The media manager 3 outputs the resultant program signal to the reproduction controller 5. The reproduction controller 5 has an internal buffer. The reproduction controller 5 stores the program signal from the media manager 3 into the internal buffer. Under the control by the system controller 9, the reproduction controller 5 reads out the program signal from the internal buffer. The reproduction controller 5 extracts the auxiliary information from the read-out program signal.

During the normal playback mode of operation of the apparatus, the reproduction controller 5 outputs the read-out program signal to the reproduced signal processor 6. In addition, the reproduction controller 5 outputs the extracted auxiliary information to the system controller 9. The reproduced signal processor 6 subjects the program signal from the reproduction controller 5 to the expansion process, for example, the MPEG-based expansion process, to get the expansion-resultant program signal. The reproduced signal processor 6 outputs the expansion-resultant program signal to the OSD processor 7. The expansion-resultant program signal has a set of a video signal and an audio signal (or audio signals). The reproduction signal processor 6 generates a sync signal related to the video signal. The reproduction signal processor 6 outputs the sync signal to the display controller 8. The system controller 9 transfers the auxiliary information from the reproduction controller 5 to the display controller 8. The display controller 8 controls the OSD processor 7 in response to the sync signal from the reproduced signal processor 6 and the auxiliary information from the system controller 9 so that the OSD processor 7 adds suitable on-screen information (OSI) to the program signal outputted from the reproduced signal processor 6. The contents of the on-screen information originate from the auxiliary information. The OSD processor 7 outputs the OSI-added program signal to, for example, the display and audio unit 15 of the television receiver. A video signal in the OSI-added program signal can be indicated on a display of the television receiver while an audio signal therein can be converted into corresponding-sounds by loudspeakers of the television receiver.

Figure 2:
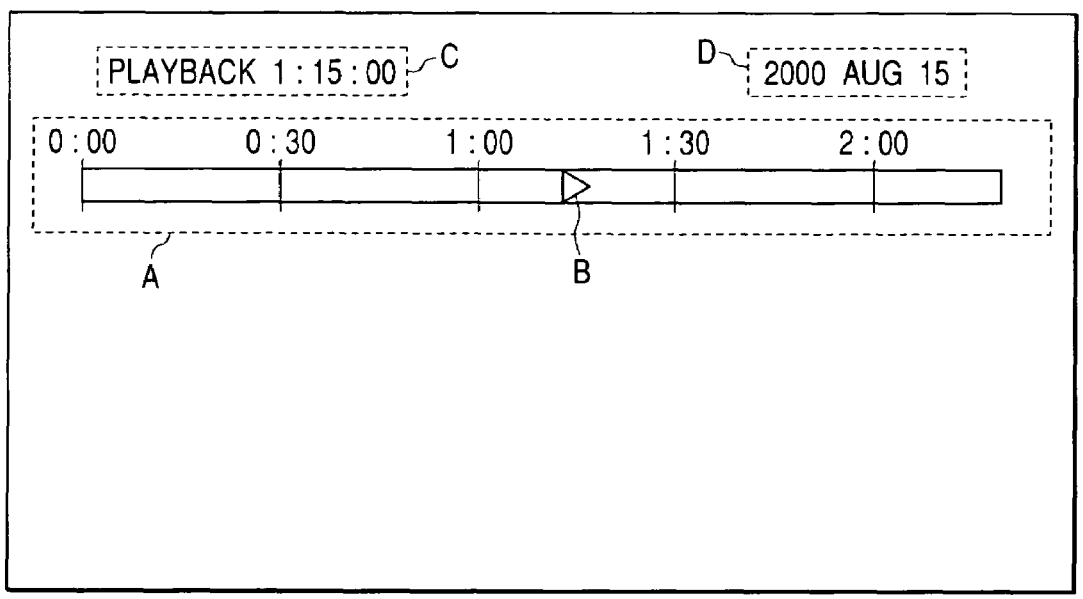
FIG. 2 is a diagram of an example of a picture represented by an OSI-added program signal which occurs during a normal playback mode of operation of the apparatus in FIG. 1.

FIG. 2 shows an example of a picture (a 1-frame picture) represented by the OSI-added program signal which occurs during the normal playback mode of operation of the apparatus. With reference to FIG. 2, the on-screen information (OSI) corresponds picture portions "A", "B", "C", and "D". Specifically, a first segment of the on-screen information (OSI) corresponds to a bar "A" denoting the overall time length, that is, the total play time, of a designated program (a played-back program). A second segment of the on-screen information corresponds to a playback position mark "B" located in the bar "A" which denotes the lapse of playback time relative to the total playback time of the designated program. A third segment of the on-screen information corresponds to numerals and characters "C" located in a left upper area of the picture which denote the lapse of playback time from the head of the designated program. A fourth segment of the on-screen information corresponds to numerals and characters "D" located in a right upper area of the picture which denote the date of the recording of the designated program.

During the cache-ON recording mode of operation of the apparatus, the recording medium 4 is used as a cache. The cache-ON recording mode of operation of the apparatus is implemented as follows. The user sets a cache hold time by operating the key input unit 12. The cache hold time corresponds to a desired time length (a desired play time) of a program signal cached in the recording medium 4. The cache hold time-may correspond to a predetermined time length (a predetermined play time). Information of the cache hold time is transmitted from the key input unit 12 to the system controller 9. A signal of a cache-ON command is inputted into the system controller 9 via the key input unit 12. The cache-ON recording mode of operation of the apparatus is started in response to the cache-ON command signal.

Operation of the record signal processor 1, the record controller 2, and the media manager 3 in the cache-ON recording mode of operation of the apparatus is basically similar to that in the normal recording mode of operation thereof. Therefore, a prescribed-format program signal which contains auxiliary information is recorded on (cached in) the recording medium 4. During the cache-ON recording mode of operation of the apparatus, the system controller 9 monitors, via the media manager 3, the play time (the time length) of the program signal cached in the recording medium 4. The system controller 9 compares the monitored play time with the cache hold time. The system controller 9 controls the media manager 3 in response to the comparison result so that the program signal cached in the recording medium 4 can be suitably updated. Thus, a latest portion of the program signal which corresponds to the cache hold time is stored in the recording medium 4 while an old portion thereof is automatically erased from the recording medium 4.

During the cache-ON recording mode of operation of the apparatus, the system controller 9 receives the present-time information from the system clock 10. The system controller 9 gets time information of the cached program signal, that is, information representing the play time (the time length) of the program signal cached in the recording medium 4. The system controller 9 feeds the present-time information and the time information of the cached program signal to the display controller 8.

During the cache-ON recording mode of operation of the apparatus, the media manager 3 transfers the auxiliary-information-added program signal from the record controller 2 to the reproduction controller 5. The reproduction controller 5 feeds the program signal to the reproduced signal processor 6. The reproduced signal processor 6 subjects the program signal from the reproduction controller 5 to the expansion process, for example, the MPEG-based expansion process, to get the expansion-resultant program signal. The reproduced signal processor 6 outputs the expansion-resultant program signal to the OSD processor 7. The expansion-resultant program signal has a set of a video signal and an audio signal (or audio signals). The reproduction signal processor 6 generates a sync signal related to the video signal. The reproduction signal processor 6 outputs the sync signal to the display controller 8. The display controller 8 controls the OSD processor 7 in response to the sync signal from the reproduced signal processor 6 and the present-time information and the cached-program-signal time information from the system controller 9 so that the OSD processor 7 adds suitable on-screen information (OSI) to the program signal outputted from the reproduced signal processor 6. The contents of the on-screen information originate from the present-time information and the cached-program signal time information. The OSD processor 7 outputs the OSI-added program signal to, for example, the display and audio unit 15 of the television receiver. A video signal in the OSI-added program signal can be indicated on the display of the television receiver while an audio signal therein can be converted into corresponding sounds by the loudspeakers of the television receiver. It should be noted that a program signal may be directly fed to the OSD processor 7 without being subjected to the compression process and the expansion process.

Figure 3:
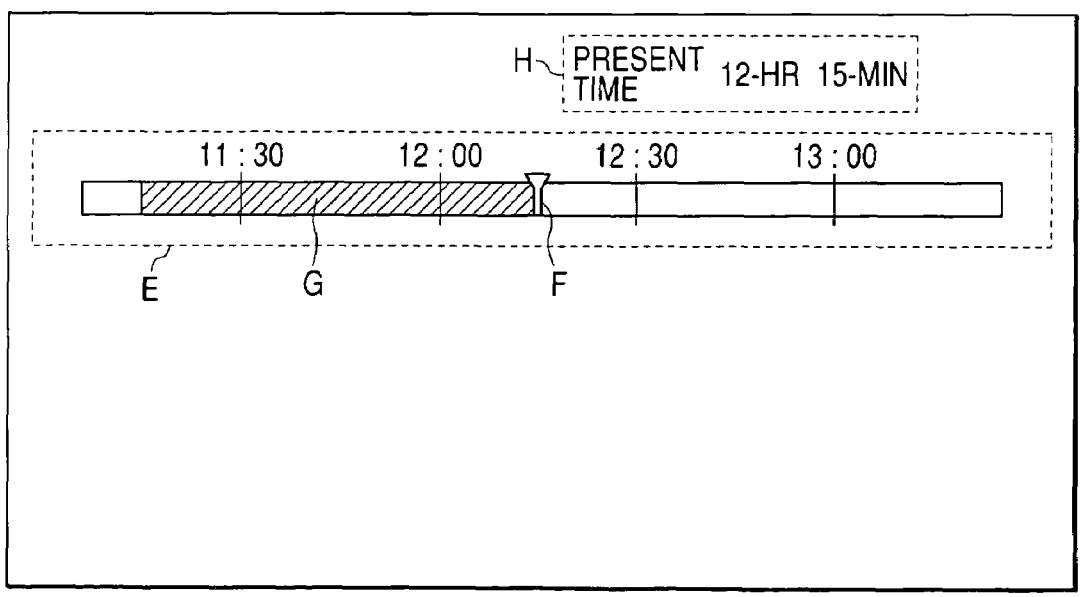
FIG. 3 is a diagram of an example of a picture represented by an OSI-added program signal which occurs during a cache-ON recording mode of operation of the apparatus in FIG. 1.

FIG. 3 shows an example of a picture (a 1-frame picture) represented by the OSI-added program signal which occurs during the cache-ON recording mode of operation of the apparatus. With reference to FIG. 3, the on-screen information (OSI) corresponds picture portions "E", "F", "G", and "H". Specifically, a first segment of the on-screen information (OSI) corresponds to a bar "E" having a scale of time. A second segment of the on-screen information relates to a record position mark "F" located at a place on the bar "E" which corresponds to the present moment. A third segment of the on-screen information corresponds to a color-changed portion "G" of the bar "E" which denotes the time length (the play time) of the program signal cached in the recording medium 4. The color-changed portion "G" of the bar "E" makes it possible to confirm the oldest end of the time range corresponding to the cached program signal. In the case of a program signal broadcasted from a television station, the color-changed portion "G" of the bar "E" indicates what time portion of the broadcasted program signal is cached and what time the oldest end of the cached program-signal portion was broadcasted. A fourth segment of the on-screen information corresponds to numerals and characters "H" located in a right upper area of the picture which denote the present time.

The cache-ON recording mode of operation of the apparatus is replaced by the cache playback mode of operation thereof when the user operates the key input unit 12 to input a rewind command signal. The rewind command signal is transmitted from the key input unit 12 to the system controller 9. The system controller 9 operates to start the cache playback mode of operation of apparatus in response to the rewind command signal.

Operation of the record signal processor 1 and the record controller 2 in the cache playback mode of operation of the apparatus is basically similar to that in the normal recording mode of operation thereof. Therefore, the record controller 2 outputs an auxiliary-information-added program signal to the media manager 3. During the cache playback mode of operation of the apparatus, the media manager 3 converts the program signal from the record controller 2 into a program signal of the prescribed format. Under the control by the system controller 9, the media manager 3 records the prescribed-format program signal on the recording medium 4. In addition, under the control by the system controller 9, the media manager 3 reproduces the cached program signal from the recording medium 4. The media manager 3 converts the reproduced program signal into a program signal of the original format. The media manager 3 outputs the resultant program signal to the reproduction controller 5. The reproduction controller 5 stores the program signal from the media manager 3 into the internal buffer while being controlled by the system controller 9.

During the cache playback mode of operation of the apparatus, the recording of the prescribed-format program signal on the recording medium 4 and the reproduction of the cached program signal from the recording medium 4 are alternately executed at a high alternation rate on a time sharing basis. Specifically, the system controller 9 controls the record controller 2 and the media manager 3 so that the program signal will be read out from the buffer in the record controller 2 and be transmitted to the media manager 3 at a record timing suited for the program signal. In addition, the system controller 9 controls the media manager 3 and the reproduction controller 5 so that the cached program signal will be reproduced from the recording medium 4 and be stored into the buffer in the reproduction controller 5 at a timing different from the record timing.

During the cache playback mode of operation of the apparatus, the reproduction controller 5 reads out the program signal from the internal buffer while being controlled by the system controller 9. The reproduction controller 5 extracts the auxiliary information from the read-out program signal. The reproduction controller 5 outputs the read-out program signal to the reproduced signal processor 6. In addition, the reproduction controller 5 outputs the extracted auxiliary information to the system controller 9. The reproduced signal processor 6 subjects the program signal from the reproduction controller 5 to the expansion process, for example, the MPEG-based expansion process, to get the expansion-resultant program signal. The reproduced signal processor 6 outputs the expansion-resultant program signal to the OSD processor 7. The expansion-resultant program signal has a set of a video signal and an audio signal (or audio signals). The reproduction signal processor 6 generates a sync signal related to the video signal. The reproduction signal processor 6 outputs the sync signal to the display controller 8. The system controller 9 transfers the auxiliary information from the reproduction controller 5 to the display controller 8. The system controller 9 receives the present-time information from the system clock 10. The system controller 9 feeds the present-time information to the display controller 8. The display controller 8 controls the OSD processor 7 in response to the sync signal from the reproduced signal processor 6 and the auxiliary information and the present-time information from the system controller 9 so that the OSD processor 7 adds suitable on-screen information (OSI) to the program signal outputted from the reproduced signal processor 6. The contents of the on-screen information originate from the auxiliary information and the present-time information. The OSD processor 7 outputs the OSI-added program signal to, for example, the display and audio unit 15 of the television receiver. A video signal in the OSI-added program signal can be indicated on the display of the television receiver while an audio signal therein can be converted into corresponding sounds by the loudspeakers of the television receiver.

Figure 4:
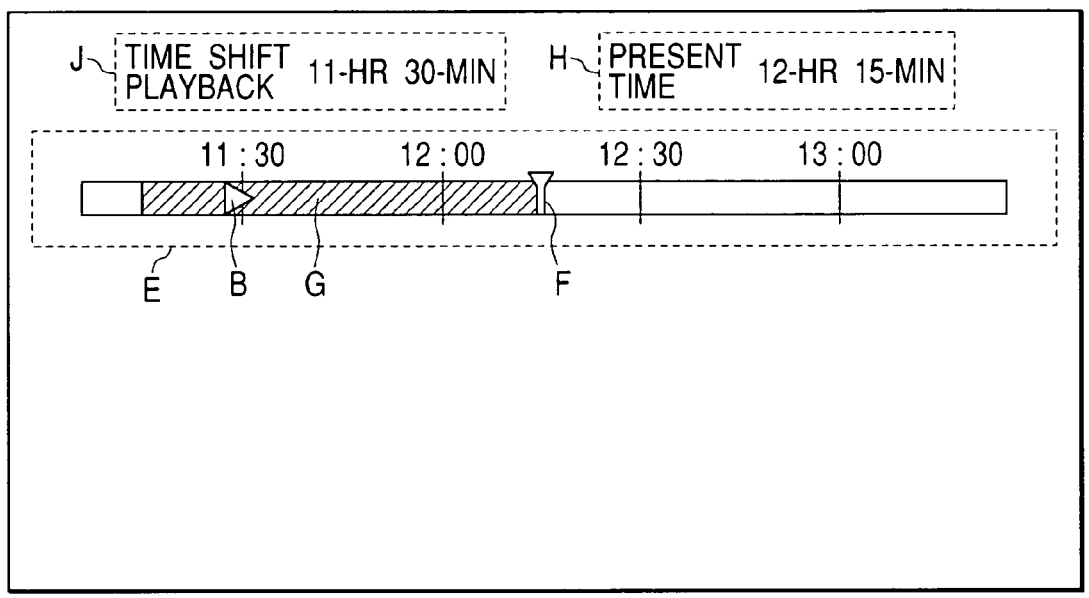
FIG. 4 is a diagram of an example of a picture represented by an OSI-added program signal which occurs during a cache playback mode of operation of the apparatus in FIG. 1.

FIG. 4 shows an example of a picture (a 1-frame picture) represented by the OSI-added program signal which occurs during the cache playback mode of operation of the apparatus. With reference to FIG. 4, the on-screen information (OSI) corresponds picture portions "B", "E", "F", "G", "H", and "J". Specifically, a first segment of the on-screen information (OSI) corresponds to a bar "E" having a scale of time. A second segment of the on-screen information relates to a record position mark "F" located at a place on the bar "E" which corresponds to the present moment. A third segment of the on-screen information relates to a playback position mark "B" located at a place on the bar "E" which denotes the time of the recording of the program-signal portion currently reproduced from the recording medium 4. A fourth segment of the on-screen information corresponds to a color-changed portion "G" of the bar "E" which denotes the time length (the play time) of the program signal cached in the recording medium 4. The color-changed portion "G" of the bar "E" makes it possible to confirm the oldest end of the time range corresponding to the cached program signal. In the case of a program signal broadcasted from a television station, the color-changed portion "G" of the bar "E" indicates what time portion of the broadcasted program signal is cached and what time the oldest end of the cached program-signal portion was broadcasted. A fifth segment of the on-screen information corresponds to numerals and characters "J" located in a left upper area of the picture which denote the time of the recording of the program-signal portion currently reproduced from the recording medium 4. A sixth segment of the on-screen information corresponds to numerals and characters "H" located in a right upper area of the picture which denote the present time.

In the cache playback mode of operation of the apparatus, when a signal of a fast-forward command (a fast-feed command) is inputted into the system controller 9 via the key input unit 12, a scene represented by the program signal which temporally follows the current playback position "B" (see FIG. 4) is retrieved as mentioned below. The system controller 9 controls the media manager 3 in response to the fast-forward command signal so that the currently-accessed point of the cached program signal on the recording medium 4 will move forward in time base. Therefore, the media manager 3 reproduces the forward program signal from the recording medium 4. The media manager 3 outputs the forward program signal to the reproduction controller 5. As a result, the currently-indicated scene moves forward in time base.

Figure 5:
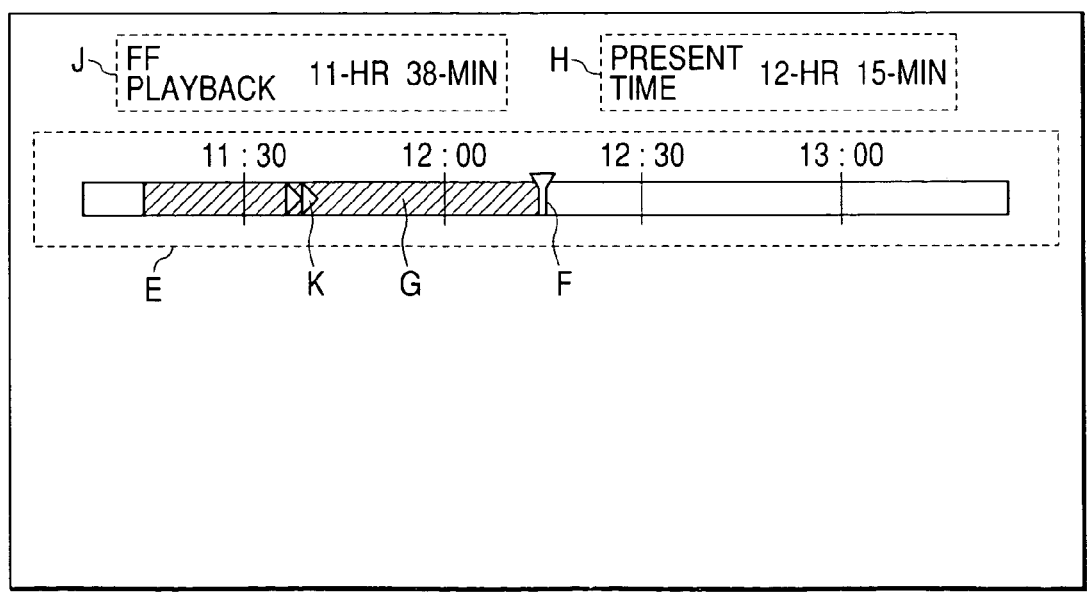
FIG. 5 is a diagram of an example of a picture represented by an OSI-added program signal which occurs during a cache fast-forward playback mode of operation of the apparatus in FIG. 1.

FIG. 5 shows an example of a picture (a 1-frame picture) represented by the OSI-added program signal which occurs during the cache fast-forward playback mode of operation of the apparatus. With reference to FIG. 5, the on-screen information (OSI) corresponds picture portions "E", "F", "G", "H", "J", and "K". The picture portions "E", "F", "G", "H", and "J" in FIG. 5 are similar to those in FIG. 4. The picture portion "K" in FIG. 5 replaces the picture portion "B" in FIG. 4. The picture portion "K" is a fast-forward position mark located at a place on the bar "E" which denotes the time of the recording of the program-signal portion currently reproduced from the recording medium 4.

In the cache playback mode of operation of the apparatus, when a signal of a rewind command is inputted into the system controller 9 via the key input unit 12, a scene represented by the program signal which temporally precedes the current playback position "B" (see FIG. 4) is retrieved as follows. The system controller 9 controls the media manager 3 in response to the rewind command signal so that the currently-accessed point of the cached program signal on the recording medium 4 will move backward in time base. Therefore, the media manager 3 reproduces the backward program signal from the recording medium 4. The media manager 3 outputs the backward program signal to the reproduction controller 5. As a result, the currently-indicated scene moves backward in time base. Picture portions corresponding to on-screen information which occurs during the cache rewind playback mode of operation of the apparatus are similar to those occurring during the cache fast-forward playback mode of operation thereof except for the following design change. A rewind position mark corresponding to a segment of the on-screen information and located at a place on the bar "E" replaces the fast-forward position mark "K" (see FIG. 5). The rewind position mark and the fast-forward position mark are symmetrical. Specifically, the rewind position mark has arrows pointing in a direction opposite to the pointing direction of arrows of the fast-forward position mark.

During the cache fast-forward playback mode of operation of the apparatus, the fast-forward position mark "K" moves toward the record position mark "F" (see FIG. 5). The system controller 9 derives, from the auxiliary information, a signal representing the currently-accessed point in the cached program signal on the recording medium 4 which corresponds to the fast-forward position mark "K". The system controller 9 compares the currently-accessed point signal with the present-moment information to decide whether or not the currently-accessed point in the cached program signal substantially reaches the currently-broadcasted segment of the program signal. When the currently-accessed point in the cached program signal substantially reaches the currently-broadcasted segment of the program signal, the system controller 9 terminates the cache fast-forward playback mode of operation of the apparatus and restarts the cache-ON recording mode of operation thereof. Accordingly, in this case, the indicated picture is changed from the type of FIG. 5 to the type of FIG. 3.

The cache playback mode, cache fast-forward playback mode, and cache rewind playback mode of operation of the apparatus can be executed for the cached program signal which corresponds to the color-changed portion "G" of the bar "E" (see FIGS. 3, 4, and 5).

As shown in FIG. 3, during the cache-ON recording mode of operation of the apparatus, only the record position mark "F" is indicated on the bar "E". As shown in FIG. 4, during the cache playback mode of operation of the apparatus, the record position mark "F" and also the playback position mark "B" are indicated on the bar "E". Therefore, in the cache playback mode of operation of the apparatus, the picture indicated on the display can be prevented from being confused with a scene represented by a currently-broadcasted program signal.

As shown in FIG. 4, during the cache playback mode of operation of the apparatus, the picture indicated on the display shows the time of the recording of the program-signal segment which is currently reproduced. Therefore, it is possible to easily confirm the time of the recording of the program-signal segment which is currently reproduced. As previously mentioned, the color-changed portion "G" of the bar "E" denotes the time length (the play time) of the program signal cached in the recording medium 4. The color-changed portion "G" of the bar "E" makes it possible to confirm the oldest end of the time range corresponding to the cached program signal. In the case of a program signal broadcasted from a television station, the color-changed portion "G" of the bar "E" indicates what time portion of the broadcasted program signal is cached and what time the oldest end of the cached program-signal portion was broadcasted.

The normal recording mode of operation of the apparatus is replaced by the time shift playback mode of operation thereof when the user operates the key input unit 12 to input a head-retrieval command signal or a command signal of requiring the playback of a recorded program signal from its head. The playback command signal (the head-retrieval command signal) is transmitted from the key input unit 12 to the system-controller 9. The system controller 9 operates to start the time shift playback mode of operation of apparatus in response to the playback command signal.

Operation of the record signal processor 1 and the record controller 2 in the time shift playback mode of operation of the apparatus is basically similar to that in the normal recording mode of operation thereof. Therefore, the record controller 2 outputs an auxiliary-information-added program signal to the media manager 3. During the time shift playback mode of operation of the apparatus, the media manager 3 converts the program signal from the record controller 2 into a program signal of the prescribed format. Under the control by the system controller 9, the media manager 3 records the prescribed-format program signal on the recording medium 4. In addition, under the control by the system controller 9, the media manager 3 reproduces the recorded program signal from the recording medium 4. Generally, the reproduction of the recorded program signal is started from its head or its desired segment. The media manager 3 converts the reproduced program signal into a program signal of the original format. The media manager 3 outputs the resultant program signal to the reproduction controller 5. The reproduction controller 5 stores the program signal from the media manager 3 into the internal buffer while being controlled by the system controller 9.

During the time shift playback mode of operation of the apparatus, the recording of the prescribed-format program signal on the recording medium 4 and the reproduction of the recorded program signal from the recording medium 4 are alternately executed at a high alternation rate on a time sharing basis. Specifically, the system controller 9 controls the record controller 2 and the media manager 3 so that the program signal will be read out from the buffer in the record controller 2 and be transmitted to the media manager 3 at a record timing suited for the program signal. In addition, the system controller 9 controls the media manager 3 and the reproduction controller 5 so that the recorded program signal will be reproduced from the recording medium 4 and be stored into the buffer in the reproduction controller 5 at a timing different from the record timing.

During the time shift playback mode of operation of the apparatus, the reproduction controller 5 reads out the program signal from the internal buffer while being controlled by the system controller 9. The reproduction controller 5 extracts the auxiliary information from the read-out program signal. The reproduction controller 5 outputs the read-out program signal to the reproduced signal processor 6. In addition, the reproduction controller 5 outputs the extracted auxiliary information to the system controller 9. The reproduced signal processor 6 subjects the program signal from the reproduction controller 5 to the expansion process, for example, the MPEG-based expansion process, to get the expansion-resultant program signal. The reproduced signal processor 6 outputs the expansion-resultant program signal to the OSD processor 7. The expansion-resultant program signal has a set of a video signal and an audio signal (or audio signals). The reproduction signal processor 6 generates a sync signal related to the video signal. The reproduction signal processor 6 outputs the sync signal to the display controller 8. The system controller 9 transfers the auxiliary information from the reproduction controller 5 to the display controller 8. The system controller 9 receives the present-time information from the system clock 10. The system controller 9 feeds the present-time information to the display controller 8. The display controller 8 controls the OSD processor 7 in response to the sync signal from the reproduced signal processor 6 and the auxiliary information and the present-time information from the system controller 9 so that the OSD processor 7 adds suitable on-screen information (OSI) to the program signal outputted from the reproduced signal processor 6. The contents of the on-screen information originate from the auxiliary information and the present-time information. The OSD processor 7 outputs the OSI-added program signal to, for example, the display and audio unit 15 of the television receiver. A video signal in the OSI-added program signal can be indicated on the display of the television receiver while an audio signal therein can be converted into corresponding sounds by the loudspeakers of the television receiver.

Figure 6:
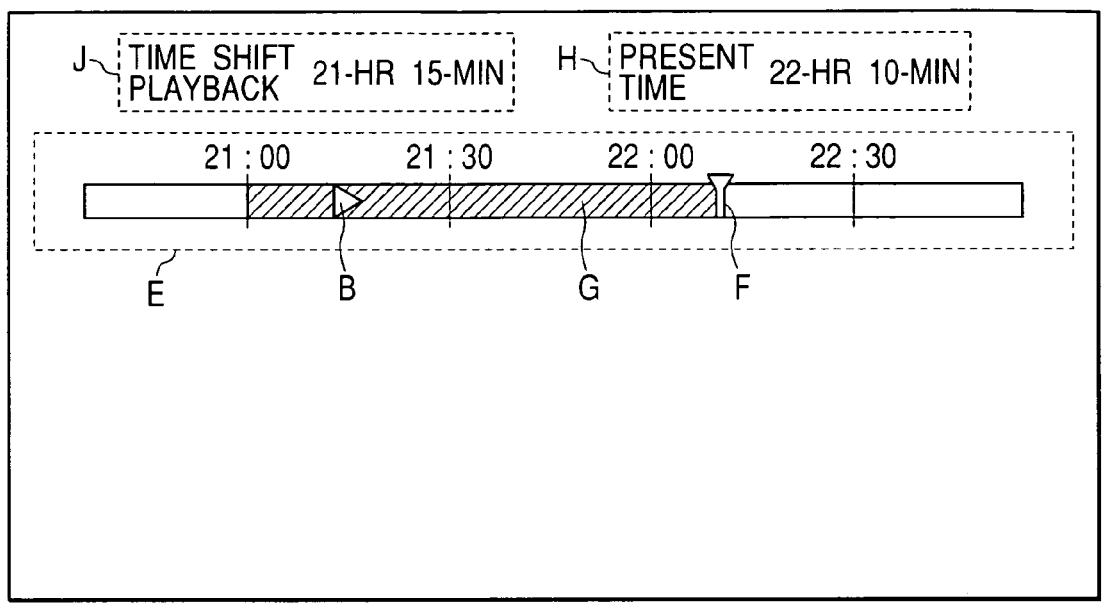
FIG. 6 is a diagram of an example of a picture represented by an OSI-added program signal which occurs during a time shift playback mode of operation of the apparatus in FIG. 1.

FIG. 6 shows an example of a picture (a 1-frame picture) represented by the OSI-added program signal which occurs during the time shift playback mode of operation of the apparatus. With reference to FIG. 6, the on-screen information (OSI) corresponds picture portions "B", "E", "F", "G", "H", and "J". Specifically, a first segment of the on-screen information (OSI) corresponds to a bar "E" having a scale of time. A second segment of the on-screen information relates to a record position mark "F" located at a place on the bar "E" which corresponds to the present moment. A third segment of the on-screen information relates to a playback position mark "B" located at a place on the bar "E" which denotes the time of the recording of the program-signal portion currently reproduced from the recording medium 4. A fourth segment of the on-screen information corresponds to a color-changed portion "G" of the bar "E" which denotes the time length (the play time) of the program signal recorded on the recording medium 4. In general, the color-changed portion "G" of the bar "E" lengthens in accordance with the lapse of time. In the case of a program signal broadcasted from a television station, the color-changed portion "G" of the bar "E" indicates what time portion of the broadcasted program signal is cached and what time the oldest end of the cached program-signal portion was broadcasted. A fifth segment of the on-screen information corresponds to numerals and characters "J" located in a left upper area of the picture which denote the time of the recording of the program-signal portion currently reproduced from the recording medium 4. A sixth segment of the on-screen information corresponds to numerals and characters "H" located in a right upper area of the picture which denote the present time.

The normal recording mode of operation of the apparatus is replaced by the time shift playback mode of operation thereof when the user operates the key input unit 12 to input a rewind command signal. The rewind command signal is transmitted from the key input unit 12 to the system controller 9. The system controller 9 operates to start the time shift playback mode of operation of apparatus in response to the rewind command signal. In general, the rewind command signal designates a point of the recorded program signal from which playback should be started. The system controller 9 notifies the media manager 3 of the designated playback start point. The media manager 3 accesses the designated playback start point of the recorded program signal in the recording medium 4. Under the control by the system controller 9, the media manager 3 reproduces the portion of the recorded program signal from the recording medium 4 which follows the designated playback start point. In this case, a rewind position mark is indicated instead of the playback position mark "B" (see FIG. 6). A fast-forward command signal may replace the rewind command signal. When a fast-forward command signal rather than a rewind command signal is inputted via the key input unit 12, a fast-forward position mark is indicated instead of the playback position mark "B" (see FIG. 6).

In the case where the input program signal is of the MPEG compressed type, the input program signal is directly fed to the record controller 2.

When the program signal of the MPEG compressed type originally contains superimposed information of the broadcasting time (the on-air time), it is unnecessary that the record controller 2 receives the present-time information from the system clock 10 via the system controller 9 and adds the received present-time information to the program signal. In this case, the reproduction controller 5 extracts the superimposed time information from the reproduced program signal as auxiliary information.

The system controller 9 may control the OSD processor 7 via the display controller 8 so that the color of the color-changed portion "G" of the bar "E" in the cache playback mode of operation of the apparatus will differ from that in the time shift playback mode of operation thereof. For example, the color is blue in the cache playback mode of operation of the apparatus, and is red in the time shift playback mode of operation thereof. In this case, the user can easily discriminate the execution of the cache playback mode of operation and the execution of the time shift playback mode of operation.

The bar "E" may be replaced by a time-indicating picture portion of another shape. The bar "E" may be replaced by an array of time indications without a scale of time. The bar "E" may be replaced by a circle having a scale of time. The playback position mark "B" and the record position mark "F" may be at positions separating from the bars "A" and "E" and corresponding to the time indications by the bars "A" and "E".

Second Embodiment

Figure 7:
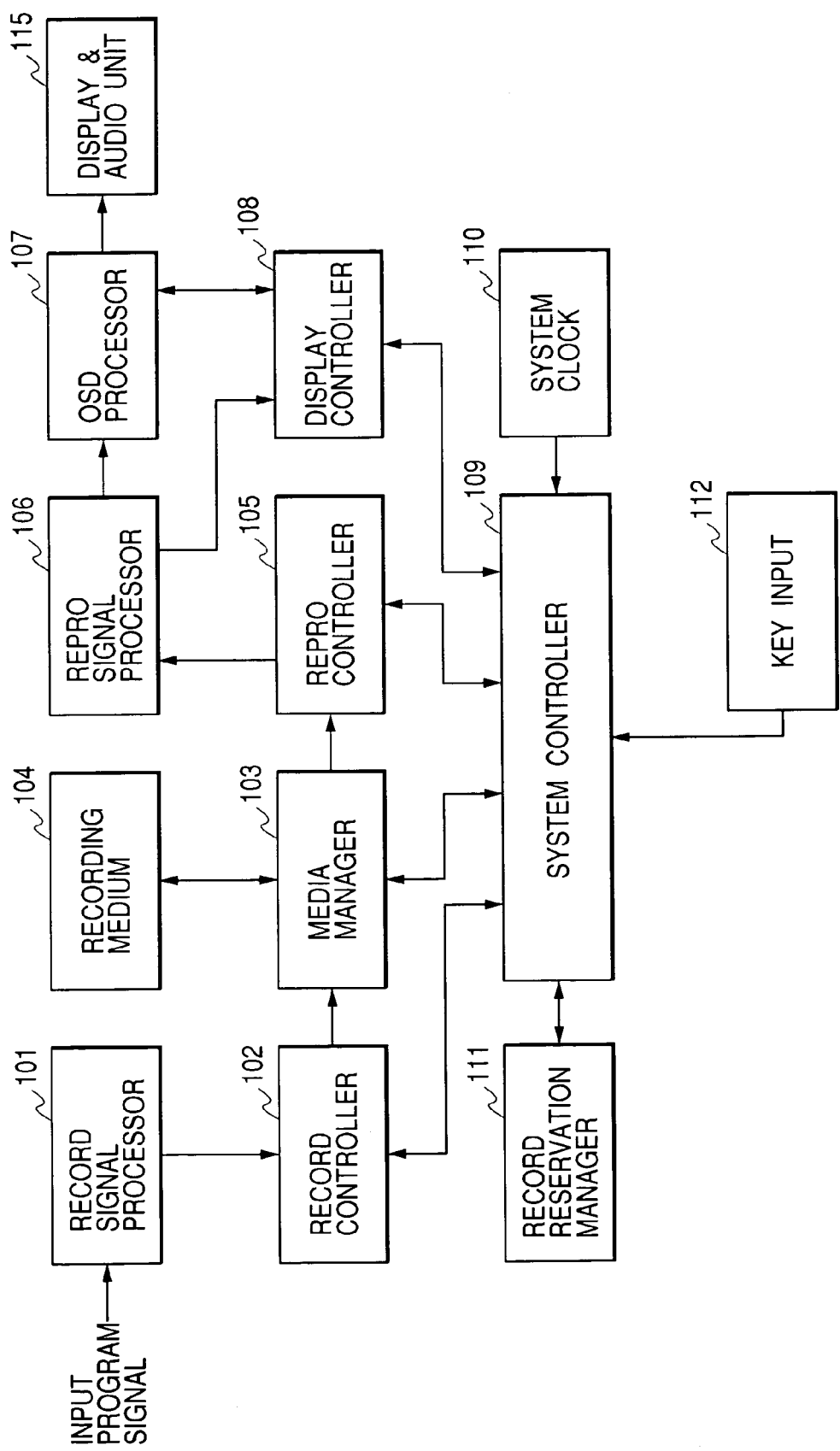
FIG. 7 is a block diagram of a program-signal recording and reproducing apparatus according to a second embodiment of this invention.

FIG. 7 shows a program-signal recording and reproducing apparatus according to a second embodiment of this invention. The apparatus of FIG. 7 can be connected with, for example, a television receiver or both a tuner and a television receiver. In the apparatus of FIG. 7, a record signal processor 101 is connected with a record controller 102. The record controller 102 is connected with a media manager 103 and a system controller 109. The media manager 103 can access a recording medium 104 which includes, for example, a hard disk or a semiconductor memory. The media manager 103 is connected with a reproduction controller 105 and the system controller 109. The reproduction controller 105 is connected with a reproduced signal processor 106 and the system controller 109. The reproduced signal controller 106 is connected with an OSD (on-screen display) processor 107 and a display controller 108. The OSD processor 107 is connected with the display controller 108. The display controller 108 is connected with the system controller 109. The system controller 109 is connected with a system clock 110, a record reservation manager 111, and a key input unit 112.

The record signal processor 101 can be connected with, for example, a tuner or a television receiver. A program signal to be recorded, that is, a signal representing a program to be recorded, is inputted into the record signal processor 101 from, for example, the tuner or the television receiver. The record signal processor 101 includes a compressive encoder such as an MPEG encoder. Here, "MPEG" is short for Moving Picture Experts Group. The record signal processor 101 subjects the input program signal to a compression process, for example, an MPEG-based compression process, to get the compression-resultant program signal (the program signal of the MPEG format). The record signal processor 101 outputs the compression-resultant program signal to the record controller 102.

The record controller 102 adds auxiliary information to the compression-resultant program signal. The record controller 102 stores the auxiliary-information-added program signal into a buffer (not shown). The record controller 102 reads out the auxiliary-information-added program signal from the buffer and outputs the read-out program signal to the media manager 103 at a prescribed timing.

The media manager 103 converts the program signal from the record controller 102 into a program signal of a prescribed format suited for record on the recording medium 104. The media manager 103 includes a drive for the recording medium 104. The media manager 103 records the prescribed-format program signal on the recording medium 104. The media manager 103 reproduces the prescribed-format program signal from the recording medium 104. The media manager 103 converts the reproduced program signal into a program signal of an original format equal to the format of a program signal outputted from the record controller 102. The media manager 103 outputs the resultant program signal to the reproduction controller 105.

The reproduction controller 105 stores the program signal from the media manager 103 into a buffer (not shown). The reproduction controller 103 reads out the program signal from the buffer and outputs the read-out program signal to the reproduced signal processor 106 at a prescribed timing. In addition, the reproduction controller 105 extracts the auxiliary information from the program signal. The reproduction controller 105 outputs the extracted auxiliary information to the system controller 109.

The reproduced signal processor 106 includes an expansive decoder such as an MPEG decoder. The reproduced signal processor 106 subjects the program signal from the reproduction controller 105 to an expansion process, for example, an MPEG-based expansion process, to get the expansion-resultant program signal. The expansion process is inverse with respect to the compression process by the record signal processor 101. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108.

The OSD processor 107 adds on-screen information (OSI) to the program signal outputted from the reproduced signal processor 106. In other words, the OSD processor 107 superimposes the on-screen information (OSI) on the program signal outputted from the reproduced signal processor 106. The OSD processor 107 can be connected with, for example, a display and audio unit 115 of the television receiver. The OSD processor 107 outputs the OSI-added program signal to, for example, the display and audio unit 115 of the television receiver. A video signal in the OSI-added program signal can be indicated on a display of the television receiver while an audio signal therein can be converted into corresponding sounds by loudspeakers of the television receiver. The display controller 108 controls the OSD processor 107 on the basis of a timing determined by the sync signal fed from the reproduced signal processor 106.

The system controller 109 controls the record controller 102, the media manager 103, the reproduction controller 105, and the display controller 108 while sending and receiving information to and from the devices 102, 103, 105, and 108. The system controller 109 includes, for example, a microcomputer or a similar device having a combination of an input/output port, a processing section, a RAM, and a ROM. The system controller 109 operates in accordance with a control program stored in the ROM. The control program is designed to enable the system controller 109 to implement steps of operation which will be mentioned later.

The system clock 110 feeds information of the present date and information of the present time to the system controller 109. The record reservation manager 111 includes a memory storing information of program reservations. The record reservation manager 111 sends and receives information to and from the system controller 109. The key input unit 112 can be operated by a user. The key input unit 112 outputs signals of user's commands to the system controller 109 when being operated by the user. The key input unit 112 includes an array of keys or buttons provided on the body of the apparatus. The key input unit 112 may include a combination of a remote control transmitter and a remote control receiver, or an external device connected via an interface such as an IEEE1394 interface.

Operation of the apparatus-of FIG. 7 can be changed among various modes in response to command signals inputted via the key input unit 112. The modes of operation of the apparatus includes a normal recording mode, a normal playback mode, a cache-ON recording mode, a cache playback mode, a cache fast-forward playback mode, a cache rewind playback mode, and a time shift playback mode.

The normal recording mode of operation of the apparatus is started when a record command signal is inputted into the system controller 109 via the key input unit 112. During the normal recording mode of operation of the apparatus, the record signal processor 101 converts an input program signal into a compressed program signal of the MPEG format. The record signal processor 101 outputs the MPEG program signal to the record controller 102. On the other hand, the system controller 109 receives the present-date information and the present-time information from the system clock 110. The system controller 109 transfers the present-date information and the present-time information to the record controller 102. The record controller 102 generates a frame information related to the MPEG program signal. The record controller 102 combines the present-date information, the present-time information, and the frame information into auxiliary information. The record controller 102 adds the auxiliary information to the MPEG program signal. The added auxiliary information is equivalent to information of the broadcasting time or the on-air time (the on-air time stamp) of the program signal. The record controller 102 has an internal buffer. The record controller 102 stores the auxiliary-information-added program signal into the internal buffer.

The record controller 102 may add the present-time information to the MPEG program signal at a prescribed timing, and then add, to the MPEG program signal, information of the lapse of time from the moment represented by the added present-time information.

During the normal recording mode of operation of the apparatus, the record controller 102 is controlled by the system controller 109 so that the auxiliary-information-added program signal is read out from the buffer in the record controller 102 and is outputted to the media manager 103. The media manager 103 is controlled by the system controller 109, thereby converting the program signal from the record controller 102 into a program signal of the prescribed format suited for record on the recording medium 104. The media manager 103 records the prescribed-format program signal on the recording medium 104 while being controlled by the system controller 109. The program signal recorded on the recording medium 104 contains the auxiliary information. In the case where the recording medium 104 includes a hard disk, the media manager 103 converts the program signal from the record controller 102 into data of a prescribed file format suited for record on the hard disk. Under the control by the system controller 109, the media manager 103 generates program-related information which represents the relation between the added auxiliary information and the addresses on the recording medium 104 at which the recorded program signal is located. The media manager 103 records the program-related information on the recording medium 104 in addition to the auxiliary-information-added program signal.

The media manager 103 may record the auxiliary information and the program-related information on a recording medium different from the recording medium 104.

In general, the system controller 109 is informed of a designated playback start point (a desired playback start point) via the key input unit 112 when the apparatus is required to operate in the normal playback mode. The system controller 109 notifies the media manager 103 of the designated playback start point. The normal playback mode of operation of the apparatus is started when a playback command signal is inputted into the system controller 109 via the key input unit 112. Specifically, in response to the playback command signal, the system controller 109 controls the media manager 103 to read out the program-related information from the recording medium 104. The media manager 103 refers to the program-related information, and thereby determines a start address on the recording medium 104 which corresponds to the designated playback start point. The media manager 103 accesses the point on the recording medium 104 which is designated by the start address. The media manager 103 reproduces a designated program signal from the recording medium 104 at the start address and subsequent addresses while being controlled by the system controller 109. Under the control by the system controller 109, the media manager 103 converts the reproduced program signal into a program signal of an original format equal to the format of a program signal outputted from the record controller 102. The media manager 103 outputs the resultant program signal to the reproduction controller 105. The reproduction controller 105 has an internal buffer. The reproduction controller 105 stores the program signal from the media manager 103 into the internal buffer. Under the control by the system controller 109, the reproduction controller 105 reads out the program signal from the internal buffer. The reproduction controller 105 extracts the auxiliary information from the read-out program signal.

During the normal playback mode of operation of the apparatus, the reproduction controller 105 outputs the read-out program signal to the reproduced signal processor 106.

In addition, the reproduction controller 105 outputs the extracted auxiliary information to the system controller 109. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108. The system controller 109 transfers the auxiliary information from the reproduction controller 105 to the display controller 108. The display controller 108 controls the OSD processor 107 in response to the sync signal from the reproduced signal processor 106 and the auxiliary information from the system controller 109 so that the OSD processor 107 adds suitable on-screen information (OSI) to the program signal outputted from the reproduced signal processor 106. The contents of the on-screen information originate from the auxiliary information. The OSD processor 107 outputs the OSI-added program signal to, for example, the display and audio unit 115 of the television receiver. A video signal in the OSI-added program signal can be indicated on a display of the television receiver while an audio signal therein can be converted into corresponding sounds by loudspeakers of the television receiver.

Picture portions "A", "B", "C", and "D" corresponding to the on-screen information (OSI) occurring in the normal playback mode of operation of the apparatus are similar to those in FIG. 2.

During the cache-ON recording mode of operation of the apparatus, the recording medium 104 is used as a cache. The cache-ON recording mode of operation of the apparatus is implemented as follows. The user sets a cache hold time by operating the key input unit 112. The cache hold time corresponds to a desired time length (a desired play time) of a program signal cached in the recording medium 104. The cache hold time may correspond to a predetermined time length (a predetermined play time). Information of the cache hold time is transmitted from the key input unit 12 to the system controller 9. The cache hold time may be replaced by a cached data amount set by the user. The setting of the cache hold time may be replaced by setting all the unoccupied area of the recording medium 104 usable as a cache. A signal of a cache-ON command is inputted into the system controller 109 via the key input unit 112. The cache-ON recording mode of operation of the apparatus is started in response to the cache-ON command signal.

Operation of the record signal processor 101, the record controller 102, and the media manager 103 in the cache-ON recording mode of operation of the apparatus is basically similar to that in the normal recording mode of operation thereof. Therefore, a prescribed-format program signal which contains auxiliary information is recorded on (cached in) the recording medium 104. During the cache-ON recording mode of operation of the apparatus, the system controller 109 monitors, via the media manager 103, the play time (the time length) of the program signal cached in the recording medium 104. The system controller 109 compares the monitored play time with the cache hold time. The system controller 109 controls the media manager 103 in response to the comparison result so that the program signal cached in the recording medium 104 can be suitably updated. Thus, a latest portion of the program signal which corresponds to the cache hold time is stored in the recording medium 104 while an old portion thereof is automatically erased from the recording medium 104.

During the cache-ON recording mode of operation of the apparatus, the system controller 109 receives the present-time information from the system clock 110. The system controller 109 gets time information of the cached program signal, that is, information representing the play time (the time length) of the program signal cached in the recording medium 104. The system controller 109 feeds the present-time information and the time information of the cached program signal to the display controller 108.

During the cache-ON recording mode of operation of the apparatus, the media manager 103 transfers the auxiliary-information-added program signal from the record controller 102 to the reproduction controller 105. The reproduction controller 105 feeds the program signal to the reproduced signal processor 106. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108. The display controller 108 controls the OSD processor 107 in response to the sync signal from the reproduced signal processor 106 and the present-time information and the cached-program-signal time information from the system controller 109 so that the OSD processor 107 adds suitable on-screen information (OSI) to the program signal outputted from the reproduced signal processor 106. The contents of the on-screen information originate from the present-time information and the cached-program-signal time information. The OSD processor 107 outputs the OSI-added program signal to, for example, the display and audio unit 115 of the television receiver. A video signal in the OSI-added program signal can be indicated on the display of the television receiver while an audio signal therein can be converted into corresponding sounds by the loudspeakers of the television receiver. It should be noted that a program signal may be directly fed to the OSD processor 107 without being subjected to the compression process and the expansion process.

Picture portions "E", "F", "G", and "H" corresponding to the on-screen information (OSI) occurring in the cache-ON recording mode of operation of the apparatus are similar to those in FIG. 3.

The cache-ON recording mode of operation of the apparatus is replaced by the cache playback mode of operation thereof when the user operates the key input unit 112 to input a rewind command signal. The rewind command signal is transmitted from the key input unit 112 to the system controller 109. The system controller 109 operates to start the cache playback mode of operation of apparatus in response to the rewind command signal.

Operation of the record signal processor 101 and the record controller 102 in the cache playback mode of operation of the apparatus is basically similar to that in the normal recording mode of operation thereof. Therefore, the record controller 102 outputs an auxiliary-information-added program signal to the media manager 103. During the cache playback mode of operation of the apparatus, the media manager 103 converts the program signal from the record controller 102 into a program signal of the prescribed format. Under the control by the system controller 109, the media manager 103 records the prescribed-format program signal on the recording medium 104. In addition, under the control by the system controller 109, the media manager 103 reproduces the cached program signal from the recording medium 104. The media manager 103 converts the reproduced program signal into a program signal of the original format. The media manager 103 outputs the resultant program signal to the reproduction controller 105. The reproduction controller 105 stores the program signal from the media manager 103 into the internal buffer while being controlled by the system controller 109.

During the cache playback mode of operation of the apparatus, the recording of the prescribed-format program signal on the recording medium 104 and the reproduction of the cached program signal from the recording medium 104 are alternately executed at a high alternation rate on a time sharing basis. Specifically, the system controller 109 controls the record controller 102 and the media manager 103 so that the program signal will be read out from the buffer in the record controller 102 and be transmitted to the media manager 103 at a record timing suited for the program signal. In addition, the system controller 109 controls the media manager 103 and the reproduction controller 105 so that the cached program signal will be reproduced from the recording medium 104 and be stored into the buffer in the reproduction controller 105 at a timing different from the record timing.

During the cache playback mode of operation of the apparatus, the reproduction controller 105 reads out the program signal from the internal buffer while being controlled by the system controller 109. The reproduction controller 105 extracts the auxiliary information from the read-out program signal. The reproduction controller 105 outputs the read-out program signal to the reproduced signal processor 106. In addition, the reproduction controller 105 outputs the extracted auxiliary information to the system controller 109. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108. The system controller 109 transfers the auxiliary information from the reproduction controller 105 to the display controller 108. The system controller 109 receives the present-time information from the system clock 110. The system controller 109 feeds the present-time information to the display controller 108. The display controller 108 controls the OSD processor 107 in response to the sync signal from the reproduced signal processor 106 and the auxiliary information and the present-time information from the system controller 109 so that the OSD processor 107 adds suitable on-screen information (OSI) to the program signal outputted from the reproduced signal processor 106. The contents of the on-screen information originate from the auxiliary information and the present-time information. The OSD processor 107 outputs the OSI-added program signal to, for example, the display and audio unit 115 of the television receiver. A video signal in the OSI-added program signal can be indicated on the display of the television receiver while an audio signal therein can be converted into corresponding sounds by the loudspeakers of the television receiver.

Picture portions "B", "E", "F", "G", "H", and "J" corresponding to the on-screen information (OSI) occurring in the cache playback mode of operation of the apparatus are similar to those in FIG. 4.

In the cache playback mode of operation of the apparatus, when a signal of a fast-forward command (a fast-feed command) is inputted into the system controller 109 via the key input unit 112, a scene represented by the program signal which temporally follows the current playback position "B" (see FIG. 4) is retrieved as mentioned below. The system controller 109 controls the media manager 103 in response to the fast-forward command signal so that the currently-accessed point of the cached program signal on the recording medium 104 will move forward in time base. Therefore, the media manager 103 reproduces the forward program signal from the recording medium 104. The media manager 103 outputs the forward program signal to the reproduction controller 105. As a result, the currently-indicated scene moves forward in time base.

Picture portions "E", "F", "G", "H", "J", and "K" corresponding to the on-screen information (OSI) occurring in the cache fast-forward playback mode of operation of the apparatus are similar to those in FIG. 5.

In the cache playback mode of operation of the apparatus, when a signal of a rewind command is inputted into the system controller 109 via the key input unit 112, a scene represented by the program signal which temporally precedes the current playback position "B" (see FIG. 4) is retrieved as follows. The system controller 109 controls the media manager 103 in response to the rewind command signal so that the currently-accessed point of the cached program signal on the recording medium 104 will move backward in time base. Therefore, the media manager 103 reproduces the backward program signal from the recording medium 104. The media manager 103 outputs the backward program signal to the reproduction controller 105. As a result, the currently-indicated scene moves backward in time base. Picture portions corresponding to on-screen information which occurs during the cache rewind playback mode of operation of the apparatus are similar to those occurring during the cache fast-forward playback mode of operation thereof except for the following design change. A rewind position mark corresponding to a segment of the on-screen information and located at a place on the bar "E" replaces the fast-forward position mark "K" (see FIG. 5). The rewind position mark and the fast-forward position mark are symmetrical. Specifically, the rewind position mark has arrows pointing in a direction opposite to the pointing direction of arrows of the fast-forward position mark.

During the cache fast-forward playback mode of operation of the apparatus, the fast-forward position mark "K" moves toward the record position mark "F" (see FIG. 5). The system controller 109 derives, from the auxiliary information, a signal representing the currently-accessed point in the cached program signal on the recording medium 104 which corresponds to the fast-forward position mark "K". The system controller 109 compares the currently-accessed point signal with the present-moment information to decide whether or not the currently-accessed point in the cached program signal substantially reaches the currently-broadcasted segment of the program signal. When the currently accessed point in the cached program signal substantially reaches the currently-broadcasted segment of the program signal, the system controller 109 terminates the cache fast-forward playback mode of operation of the apparatus and restarts the cache-ON recording mode of operation thereof. Accordingly, in this case, the indicated picture is changed from the type of FIG. 5 to the type of FIG. 3.

The cache playback mode, cache fast-forward playback mode, and cache rewind playback mode of operation of the apparatus can be executed for the cached program signal which corresponds to the color-changed portion "G" of the bar "E" (see FIGS. 3, 4, and 5).

The system controller 109 has information of predetermined time points spaced at equal intervals. For example, the predetermined time points are 0000, 0030, 0100, 0130, . . . , 2300, and 2330 hours (that is, 00:00, 00:30, 01:00, 01:30, . . . , 23:00, and 23:30). The predetermined time points are used in operation of the apparatus which responds to a head-retrieval command signal. An example of operation of the apparatus in response to the head-retrieval command signal is as follows. With reference to FIG. 3, the present time is between 1200 hours and 1230 hours (between 12:00 and 12:30). In the case where a head retrieval command signal is inputted once via the key input unit 112 during the cache-ON recording mode of operation of the apparatus, one is selected from the predetermined time points which immediately precedes the present time. Since the present time is between 1200 hours and 1230 hours, the selected predetermined time point is 1200 hours (12:00). The portion of the cached program signal which temporally follows 1200 hours starts to be played back. When a head-retrieval command signal is inputted twice in quick succession, one is selected from the predetermined time points which second immediately precedes the present time. The selected predetermined time point is 1130 hours (11:30). The portion of the cached program signal which temporally follows 1130 hours starts to be played back. When a head-retrieval command signal is inputted three times in quick succession, one is selected from the predetermined time points which third immediately precedes the present time. The selected predetermined time point is 1100 hours (11:00). As shown in FIG. 3, a segment corresponding to 1100 hours is absent from the cached program signal. In this case, the cached program signal starts to be played back from its head.

To implement the above-mentioned operation of the apparatus in response to a head-retrieval command signal, the system controller 109 and the media manager 103 act as follows. In the case where a head-retrieval command signal is inputted once into the system controller 109 via the key input unit 112 during the cache-ON recording mode of operation of the apparatus, the system controller 109 gets the present-time information from the system clock 110. The system controller 109 selects one from the predetermined time points which immediately precedes the present time. The selected predetermined time point corresponds to a designated playback start point. For example, the system controller 109 sets time information to the present-time information, and moves back the value represented by the time information until the minute part thereof reaches 00 or 30. The resultant time information is playback start point information. The system controller 109 notifies the media manager 103 of the selected predetermined time point (the playback start point information). The system controller 109 controls the media manager 103 to read out the program-related information from the recording medium 104. The media manager 103 refers to the program-related information, and thereby determines a start address on the recording medium 104 which corresponds to the selected predetermined time point (the designated playback start point). The media manager 103 accesses the point on the recording medium 104 which is designated by the start address. The media manager 103 reproduces the portion of the cached program signal from the recording medium 104 at the start address and subsequent addresses while being controlled by the system controller 109. Thus, the portion of the cached program signal which temporally follows the selected predetermined time point starts to be played back. In the absence of a segment of the cached program signal which corresponds to the selected predetermined time point, the media manager 103 accesses the head of the cached program signal in the recording medium 104. In this case, the media manager 103 reproduces the head and subsequent segments of the cached program signal from the recording medium 104. Thus, the cached program signal starts to be played back from its head. When a head-retrieval command signal is inputted twice in quick succession, the system controller 109 selects one from the predetermined time points which second immediately precedes the present time. The system controller 109 notifies the media manager 103 of the selected predetermined time point (the playback start point information). The media manager 103 refers to the program-related information, and thereby determines a start address on the recording medium 104 which corresponds to the selected predetermined time point (the designated playback start point). The media manager 103 accesses the point on the recording medium 104 which is designated by the start address. The media manager 103 reproduces the portion of the cached program signal from the recording medium 104 at the start address and subsequent addresses while being controlled by the system controller 109. Thus, the portion of the cached program signal which temporally follows the selected predetermined time point starts to be played back. In the absence of a segment of the cached program signal which corresponds to the selected predetermined time point, the media manager 103 accesses the head of the cached program signal in the recording medium 104. In this case, the media manager 103 reproduces the head and subsequent segments of the cached program signal from the recording medium 104. Thus, the cached program signal starts to be played back from its head.

In the case where a backward head-retrieval command signal is inputted into the system controller 109 via the key input unit 112 during the cache playback mode of operation of the apparatus, the system controller 109 selects one from the predetermined time points which immediately precedes the playback position (corresponding to the playback position mark "B"). The selected predetermined time point corresponds to a designated playback start point. For example, the system controller 109 sets time information into agreement with the playback position, and moves back the value represented by the time information until the minute part thereof reaches 00 or 30. The resultant time information is playback start point information. The system controller 109 notifies the media manager 103 of the selected predetermined time point (the playback start point information). The system controller 109 controls the media manager 103 to read out the program-related information from the recording medium 104. The media manager 103 refers to the program-related information, and thereby determines a start address on the recording medium 104 which corresponds to the selected predetermined time point (the designated playback start point). The media manager 103 accesses the point on the recording medium 104 which is designated by the start address. The media manager 103 reproduces the portion of the cached program signal from the recording medium 104 at the start address and subsequent addresses while being controlled by the system controller 109. Thus, the portion of the cached program signal which temporally follows the selected predetermined time point starts to be played back. In the absence of a segment of the cached program signal which corresponds to the selected predetermined time point, the media manager 103 accesses the head of the cached program signal in the recording medium 104. In this case, the media manager 103 reproduces the head and subsequent segments of the cached program signal from the recording medium 104. Thus, the cached program signal starts to be played back from its head. It should be noted that the cache playback mode of operation of the apparatus may be replaced by the cache-ON recording mode of operation thereof when a head-retrieval command signal is inputted twice in quick succession.

In the case where a forward head-retrieval command signal is inputted into the system controller 109 via the key input unit 112 during the cache playback mode of operation of the apparatus, the system controller 109 selects one from the predetermined time points which immediately follows the playback position (corresponding to the playback position mark "B"). The selected predetermined time point corresponds to a designated playback start point. For example, the system controller 109 sets time information into agreement with the playback position, and moves forward the value represented by the time information until the minute part thereof reaches 00 or 30. The resultant time information is playback start point information. The system controller 109 notifies the media manager 103 of the selected predetermined time point (the playback start point information). The system controller 109 controls the media manager 103 to read out the program-related information from the recording medium 104. The media manager 103 refers to the program-related information, and thereby determines a start address on the recording medium 104 which corresponds to the selected predetermined time point (the designated playback start point). The media manager 103 accesses the point on the recording medium 104 which is designated by the start address. The media manager 103 reproduces the portion of the cached program signal from the recording medium 104 at the start address and subsequent addresses while being controlled by the system controller 109. Thus, the portion of the cached program signal which temporally follows the selected predetermined time point starts to be played back. In the absence of a segment of the cached program signal which corresponds to the selected predetermined time point, the media manager 103 assumes an inactive state regarding playback.

The normal recording mode of operation of the apparatus is replaced by the time shift playback mode of operation thereof when the user operates the key input unit 112 to input a head-retrieval command signal. The head-retrieval command signal is transmitted from the key input unit 112 to the system controller 109. The system controller 9 operates to start the time shift playback mode of operation of apparatus in response to the head-retrieval command signal.

Operation of the record signal processor 101 and the record controller 102 in the time shift playback mode of operation of the apparatus is basically similar to that in the normal recording mode of operation thereof. Therefore, the record controller 102 outputs an auxiliary-information-added program signal to the media manager 103. During the time shift playback mode of operation of the apparatus, the media manager 103 converts the program signal from the record controller 102 into a program signal of the prescribed format. Under the control by the system controller 109, the media manager 103 records the prescribed-format program signal on the recording medium 104. In addition, under the control by the system controller 109, the media manager 103 reproduces the recorded program signal from the recording medium 104. Generally, the reproduction of the recorded program signal is started from its head or its desired segment. The media manager 103 converts the reproduced program signal into a program signal of the original format. The media manager 103 outputs the resultant program signal to the reproduction controller 105. The reproduction controller 105 stores the program signal from the media manager 103 into the internal buffer while being controlled by the system controller 109.

During the time shift playback mode of operation of the apparatus, the recording of the prescribed-format program signal on the recording medium 104 and the reproduction of the recorded program signal from the recording medium 104 are alternately executed at a high alternation rate on a time sharing basis. Specifically, the system controller 109 controls the record controller 102 and the media manager 103 so that the program signal will be read out from the buffer in the record controller 102 and be transmitted to the media manager 103 at a record timing suited for the program signal. In addition, the system controller 109 controls the media manager 103 and the reproduction controller 105 so that the recorded program signal will be reproduced from the recording medium 104 and be stored into the buffer in the reproduction controller 105 at a timing different from the record timing.

During the time shift playback mode of operation of the apparatus, the reproduction controller 105 reads out the program signal from the internal buffer while being controlled by the system controller 109. The reproduction controller 105 extracts the auxiliary information from the read-out program signal. The reproduction controller 105 outputs the read-out program signal to the reproduced signal processor 106. In addition, the reproduction controller 105 outputs the extracted auxiliary information to the system controller 109. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108. The system controller 109 transfers the auxiliary information from the reproduction controller 105 to the display controller 108. The system controller 109 receives the present-time information from the system clock 110. The system controller 109 feeds the present-time information to the display controller 108. The display controller 108 controls the OSD processor 107 in response to the sync signal from the reproduced signal processor 106 and the auxiliary information and the present-time information from the system controller 109 so that the OSD processor 107 adds suitable on-screen information (OSI) to the program signal outputted from the reproduced signal processor 106. The contents of the on-screen information originate from the auxiliary information and the present-time information. The OSD processor 107 outputs the OSI-added program signal to, for example, the display and audio unit 115 of the television receiver. A video signal in the OSI-added program signal can be indicated on the display of the television receiver while an audio signal therein can be converted into corresponding sounds by the loudspeakers of the television receiver.

Picture portions "B", "E", "F", "G", "H", and "J" corresponding to the on-screen information (OSI) occurring in the time shift playback mode of operation of the apparatus are similar to those in FIG. 6.

In the case where a head-retrieval command signal is inputted to the system controller 109 via the key input unit 112 during the time shift playback mode of operation of the apparatus, the system controller 109 controls the media manager 103 to access the head of the recorded program signal on the recording medium 104. The media manager 103 reproduces the head and subsequent segments of the recorded program signal from the recording medium 104. Thus, the recorded program signal starts to be played back from its head.

The normal recording mode of operation of the apparatus is replaced by the time shift playback mode of operation thereof when the user operates the key input unit 112 to input a rewind command signal. The rewind command signal is transmitted from the key input unit 112 to the system controller 109. The system controller 109 operates to start the time shift playback mode of operation of apparatus in response to the rewind command signal. In general, the rewind command signal designates a point of the recorded program signal from which playback should be started. The system controller 109 notifies the media manager 103 of the designated playback start point. The media manager 103 accesses the designated playback start point of the recorded program signal in the recording medium 104. Under the control by the system controller 109, the media manager 103 reproduces the portion of the recorded program signal from the recording medium 104 which follows the designated playback start point. In this case, a rewind position mark is indicated instead of the playback position mark "B" (see FIG. 6). A fast-forward command signal may replace the rewind command signal. When a fast-forward command signal rather than a rewind command signal is inputted via the key input unit 112, a fast-forward position mark is indicated instead of the playback position mark "B" (see FIG. 6).

In the case where the input program signal is of the MPEG compressed type, the input program signal is directly fed to the record controller 102.

When the program signal of the MPEG compressed type originally contains superimposed information of the broadcasting time (the on-air time), it is unnecessary that the record controller 102 receives the present-time information from the system clock 110 via the system controller 109 and adds the received present-time information to the program-signal. In this case, the reproduction controller 105 extracts the superimposed time information from the reproduced program signal as auxiliary information.

The apparatus of FIG. 7 can handle an input program signal containing superimposed program guide information such as superimposed EPG (electronic program guide) information. During operation of the apparatus of FIG. 7, the program guide information is recorded on the recording medium 104 together with the related program signal. In addition, the program guide information is reproduced from the recording medium 104 together with the related program signal. The record controller 102 and the reproduction controller 105 can extract the program guide information from the related program signal.

During the cache-ON recording mode of operation of the apparatus, the record controller 102 receives the MPEG program signal from the record signal processor 101. The record controller 102 extracts the program guide information from the MPEG program signal. The record controller 102 outputs the extracted program guide information to the system controller 109. During the cache-ON recording mode of operation of the apparatus, the media manager 103 transfers the auxiliary-information-added program signal from the record controller 102 to the reproduction controller 105 as previously mentioned. The reproduction controller 105 feeds the program signal to the reproduced signal processor 106. The reproduced signal processor 106 subjects the program signal from the reproduction controller 105 to the expansion process, for example, the MPEG-based expansion process, to get the expansion-resultant program signal. The reproduced signal processor 106 outputs the expansion-resultant program signal to the OSD processor 107. The expansion-resultant program signal has a set of a video signal and an audio signal (or audio signals). The reproduction signal processor 106 generates a sync signal related to the video signal. The reproduction signal processor 106 outputs the sync signal to the display controller 108. As previously mentioned, the system controller 109 transfers the present-time information and the cached-program-signal time information to the display controller 108. In addition, the system controller 109 transfers the program guide information to the display controller 108. The display controller 108 controls the OSD processor 107 in response to the sync signal from the reproduced signal processor 106, and the present-time information, the cached-program-signal time information, and the program guide information from the system controller 109 so that the OSD processor 107 adds suitable on-screen information (OSI) to the program signal outputted from the reproduced signal processor 106. The contents of the on-screen information originate from the present-time information, the cached-program-signal time information, and the program guide information. The OSD processor 107 outputs the OSI-added program signal to, for example, the display and audio unit 115 of the television receiver. A video signal in the OSI-added program signal can be indicated on the display of the television receiver while an audio signal therein can be converted into corresponding sounds by the loudspeakers of the television receiver. It should be noted that a program signal may be directly fed to the OSD processor 107 without being subjected to the compression process and the expansion process.

Figure 8:
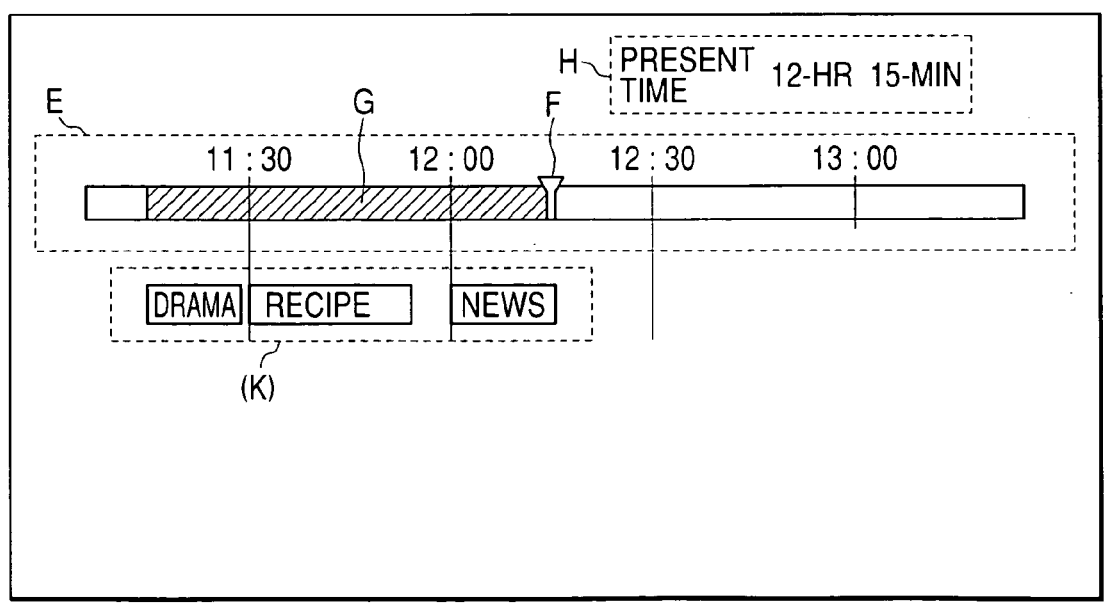
FIG. 8 is a diagram of an example of a picture represented by an OSI-added program signal which occurs during a cache-ON recording mode of operation of the apparatus in FIG. 7.

FIG. 8 shows an example of a picture (a 1-frame picture) represented by the OSI-added program signal which occurs during the cache-ON recording mode of operation of the apparatus. With reference to FIG. 8, the on-screen information (OSI) corresponds picture portions "E", "F", "G", "H", and "L". The picture portions "E", "F", "G", and "H" are similar to those in FIG. 3. As shown in FIG. 8, the picture portion "L" extends below the bar "E". The picture portion "L" has a set of rectangles containing letters indicating the names of respective program portions represented by the cached program signal. The indicated program names in the picture portion "L" originate from the program guide information. In FIG. 8, the picture portion "L" shows that the program portion related to a recipe started at 11:30, and the program portion related to news started at 12:00.

With reference to FIG. 8, the present time is between 1200 hours and 1230 hours (between 12:00 and 12:30). In the case where a head-retrieval command signal is inputted once via the key input unit 112 during the cache-ON recording mode of operation of the apparatus, one is selected from the predetermined time points which immediately precedes the present time. Since the present time is between 1200 hours and 1230 hours, the selected predetermined time point is 1200 hours (12:30). The portion of the cached program signal which temporally follows 1200 hours starts to be played back. Thus, the cached program portion related to news starts to be played back from its head. When a head-retrieval command signal is inputted twice in quick succession, one is selected from the predetermined time points which second immediately precedes the present time. The selected predetermined time point is 1130 hours. The portion of the cached program signal which temporally follows 1130 hours starts to be played back. Thus, the cached program portion related to a recipe starts to be played back from its head.

The system controller 109 may control the OSD processor 107 via the display controller 108 so that the color of the color-changed portion "G" of the bar "E" in the cache playback mode of operation of the apparatus will differ from that in the time shift playback mode of operation thereof. For example, the color is blue in the cache playback mode of operation of the apparatus, and is red in the time shift playback mode of operation thereof. In this case, the user can easily discriminate the execution of the cache playback mode of operation and the execution of the time shift playback mode of operation.

What is claimed is:

1. A program-signal recording and reproducing apparatus for recording a program signal on a recording medium, and reproducing an already-recorded portion of the program signal which is being recorded on the recording medium, the apparatus comprising:

time information generating means for generating time information in accordance with lapse of time;

recording means for recording the time information generated by the time information generating means or time information indicating time at which the program signal is broadcasted on the recording medium together with the program signal;

a head retrieval command input means for sequentially performing program head retrieval commands; and first head retrieval reproduction means for, when each of the program head retrieval commands is performed by the head retrieval command input means, obtaining present time information generated by the time information generating means and performing head retrieval reproduction of the program signal recorded at one of specific time points which are previous to and independent of the present time represented by the obtained present time information, and which are after a beginning of the recording of the program signal on the recording medium and in a duration of the recorded program signal;

wherein the specified time points are sequentially selected by the first head retrieval reproduction means in response to the program head retrieval commands in an order such that first selected one of the specified time points is closer to the present time than others of the specified time points are wherein each of the specified time points has a minute part of one of (1) 00 and (2) 30.

2. A program-signal recording and reproducing apparatus as recited in claim 1, further comprising:

a cache playback mode in which a program signal temporally continuous from past to now is always recorded on a recording medium while a prescribed amount is a limit, and an already-recorded portion of the program signal which is being recorded is reproduced;

a time shift playback mode in which, with respect to a program signal recorded on the recording medium on the basis of a record start timing decided by operation by a user, and an already-recorded portion of the program signal which is being recorded is reproduced; and second head retrieval reproduction means for, when the program head retrieval command is performed by the head retrieval command input means, performing head retrieval reproduction of the program signal from the record start timing;

wherein the head retrieval reproduction is performed by the first head retrieval reproduction means in the cache playback mode, and the head retrieval reproduction is performed by the second head retrieval reproduction means in the time shift playback mode.

3. A program-signal recording and reproduction apparatus as recited in claim 1, wherein the first head retrieval reproduction means comprises means for performing head retrieval reproduction of the program signal from the beginning of the recording of the program signal when none of the specified time points are usable as effective ones.

4. A program-signal recording and reproducing apparatus as recited in claim 1, wherein each of the specified time points is independent of the beginning of the recording of the program signal on the recording medium.

5. A program-signal recording and reproducing apparatus comprising:

first means for recording a program signal on a recording medium;

second means for generating first time information representing the present time;

third means for generating second time information representing one of (1) time at which the program signal was recorded by the first means and (2) time at which the program signal was broadcasted;

fourth means for determining specified time points which precede and are independent of the present time represented by the first time information generated by the second means, and which are after a beginning of the recording of the program signal on the recording medium and in a duration of the recorded program signal; and fifth means for finding a segment of the program signal on the recording medium according to each of the specified time points determined by the fourth means and the second time information generated by the third means, the program-signal segment relating to the second time information corresponding to the specified time point, and for reproducing the found segment and subsequent segments of the program signal from the recording medium;

wherein the specified time points are sequentially selected by the fifth means in an order such that first selected one of the specified time points is closer to the present time than others of the specified time points are wherein each of the specified time points has a minute part of one of (1) 00 and (2) 30.

6. A program-signal recording and reproducing apparatus as recited in claim 5, wherein each of the specified time points is independent of the beginning of the recording of the program signal on the recording medium.

7. A program-signal recording and reproducing apparatus comprising:
- first means for recording a first program signal on a recording medium while leaving only a latest temporally-continuous portion of the first program signal in the recording medium as a cached portion;
- second means for generating first time information representing the present time;
- third means for generating second time information representing one of (1) time at which the first program signal was recorded by the first means and (2) time at which the first program signal was broadcasted;
- fourth means for determining specified time points which precede and are independent of the present time represented by the first time information generated by the second means, and which are after a beginning of the recording of the first program signal on the recording medium and in a duration of the recorded first program signal;
- fifth means for sequentially accepting head-retrieval commands;
- sixth means responsive to each of the head-retrieval commands accepted by the fifth means for finding a segment of the latest temporally-continuous portion of the first program signal on the recording medium according to one of the specified time points determined by the fourth means and the second time information generated by the third means, the program-signal segment relating to the second time information corresponding to the one of the specified time points, and for reproducing the found segment and subsequent segments of the first program signal from the recording medium during a cache playback mode of operation;
- seventh means for recording a second program signal on the recording medium in response to a designated record start timing; and
- eighth means responsive to each of the head-retrieval commands accepted by the fifth means for reproducing the second program signal from the recording medium during a time shift playback mode of operation;
- wherein the specified time points are sequentially selected by the sixth means in an order such that first selected one of the specified time points is closer to the present time than others of the specified time points are
- wherein each of the specified time points has a minute part of one of (1) 00 and (2) 30.

8. A program-signal recording and reproducing apparatus as recited in claim 7, wherein each of the specified time points is independent of the beginning of the recording of the first program signal on the recording medium.

* * * * *